United States Patent [19]

Bailey et al.

[11] Patent Number: 4,914,975

[45] Date of Patent: * Apr. 10, 1990

[54] SERPENTINE TUBE INSPECTION POSITIONING SPINE

[75] Inventors: William E. Bailey; John H. Flora, both of Lynchburg; Robert E. Womack, Forest, all of Va.

[73] Assignee: The Babcock & Wilcox Company, New Orleans, La.

[*] Notice: The portion of the term of this patent subsequent to Jan. 30, 2007 has been disclaimed.

[21] Appl. No.: 399,036

[22] Filed: Aug. 28, 1989

Related U.S. Application Data

[62] Division of Ser. No. 260,161, Oct. 21, 1988, Pat. No. 4,896,555.

[51] Int. Cl.$^4$ ................................. F16C 1/20
[52] U.S. Cl. ................................. 74/502.5; 464/119
[58] Field of Search ............... 74/502.5, 502.3, 502, 74/500.5, 501.6, 502.6; 464/115, 117, 119, 174, 178, 112, 114, 173, 149; 138/129, 120; 384/49; 254/389; 403/291; 59/78, 84; 198/851, 852, 853

[56] References Cited

U.S. PATENT DOCUMENTS

| | | | |
|---|---|---|---|
| 416,427 | 12/1889 | Sibley | 464/114 |
| 421,587 | 2/1870 | Krell | 464/178 X |
| 708,876 | 9/1902 | Edwards | 74/502 |
| 733,181 | 7/1903 | Forsyth | 464/119 |
| 855,106 | 5/1907 | Hensel | 74/502.5 |
| 1,602,691 | 10/1926 | McCaskey | 464/174 X |
| 1,635,929 | 7/1927 | Dean | 464/119 |
| 1,662,093 | 3/1928 | Wells et al. | 74/502.5 X |
| 3,625,084 | 12/1971 | Siebert | 74/502.5 |

FOREIGN PATENT DOCUMENTS

| | | | |
|---|---|---|---|
| 0181689 | 3/1907 | Fed. Rep. of Germany | 74/502.5 |
| 494160 | 3/1930 | Fed. Rep. of Germany | 464/119 |
| 2053841 | 5/1972 | Fed. Rep. of Germany | 74/502.5 |
| 1079598 | 12/1954 | France | 74/502.3 |
| 495894 | of 0000 | United Kingdom | 74/502.3 |
| 2188 | of 1897 | United Kingdom | 464/117 |
| 15756 | of 1903 | United Kingdom | 464/119 |

Primary Examiner—Rodney M. Lindsey
Attorney, Agent, or Firm—Robert J. Edwards; D. Neil LaHaye

[57] ABSTRACT

A serpentine tube inspection positioning spine formed from a plurality of identical links mated together. Each link has first and second bifurcated ends with the first end sized to fit within the second end of an adjacent link. Links are mated together by a pivot pin or axle which is accepted in a bore through the bifurcated ends. The second bifurcated end is provided with a substantially oval-shaped bore to allow sliding of the adjacent links relative to each other. Flat alignment faces on each end, with the first end having rounded corners, prevent buckling due to compressive forces during insertion while still allowing pivoting of the links for traveling through tubing bends.

4 Claims, 2 Drawing Sheets

SERPENTINE TUBE INSPECTION POSITIONING SPINE

This application is a division of application Ser. No. 07/260,161, filed Oct. 21, 1988 now U.S. Pat. No. 4,896,555.

BACKGROUND OF THE INVENTION

1. Field of the Invention

The present invention is generally related to non-destructive inspection of pipes and tubing and in particular to positioning of inspection devices at various locations along the interior of serpentine-bent tube sections.

2. General Background

Many boilers have serpentine-bent horizontal tube sections. Such tube sections are generally of a 1 to 2 inch inner diameter with multiple (as many as 20) tight radius 180 degree bends and may be several hundred feet long. Non-destructive testing of the interior of the tubing is accomplished by the use of transducers. The type of mechanism used to move a transducer through a tube is chosen depending on tube diameter, the number, direction, extent, and radius of bends, and the length of the tube to be inspected. Moderately short lengths of tubing with few and gradual bends often depend upon a flexible cable similar to a plumber's "snake" for movement of an inspection transducer. Such devices are not known to be applicable to boiler tubes as described above. "Tractor" devices capable of negotiating the sharp bends and pulling a transducer and its signal cable along are also not known. Flexible cables pushed from the end of the tube are impractical beyond the first or second bend in the tubing due to the build up of drag forces. Various devices of which the inventors are aware include the following.

U.S. Pat. No. 3,583,393, No. 3,497,083, and No. 4,238,973 disclose selectively bendable tube assemblies and manipulators.

U.S. Pat. No. 2,748,803 and No. 4,648,733 disclose a reinforced hose and installation template for conduits.

U.S. Pat. No. 3,623,756 and No. 3,918,821 disclose articulated connectors.

U.S. Pat. No. 4,290,762, No. 3,020,362 and No. 3,197,954 disclose various link chains.

Although a variety of flexible connectors are available, none fit the need to be able to travel through serpentine tube sections as described above wherein the device must be capable of being pushed through the tubes and then pulled back out once inspection is completed.

The problems encountered are as follows. During insertion, when the device is being pushed through the tube, compression forces result in the links having a tendency to buckle at the link connecting pivot points, causing lock-up in straight sections of the tube and generating side loads that quickly become unacceptably high. Major drag forces are also generated in the bend areas of the tube during insertion and removal of known devices.

SUMMARY OF THE INVENTION

The present invention solves the aforementioned problem in a straightforward manner. What is provided is a positioning spine formed from a series of rigid links. Both ends of the links are bifurcated and sized such that a first bifurcated end of one link is received within the second bifurcated end of an adjacent link. Coaxial bores are provided in each projection of the bifurcations and receive an axle which joins adjacent links together. Wheels mounted on the axles allow rolling movement of the spine through the tubing with a minimum of friction. Separate alignment faces are provided on the first bifurcated end of each link along with the capability of the links to slide longitudinally relative to each other. This combines to allow limited pivoting of the links relative to each other for traveling through a tight radius bend while maintaining alignment of the links in the straight portions of the tubing.

BRIEF DESCRIPTION OF THE DRAWINGS

For a further understanding of the nature and objects of the present invention, reference should be had to the following description taken in conjunction with the accompanying drawings, in which like parts are given like reference numerals and, wherein.

DETAILED DESCRIPTION OF THE PREFERRED EMBODIMENT

Figure 1:
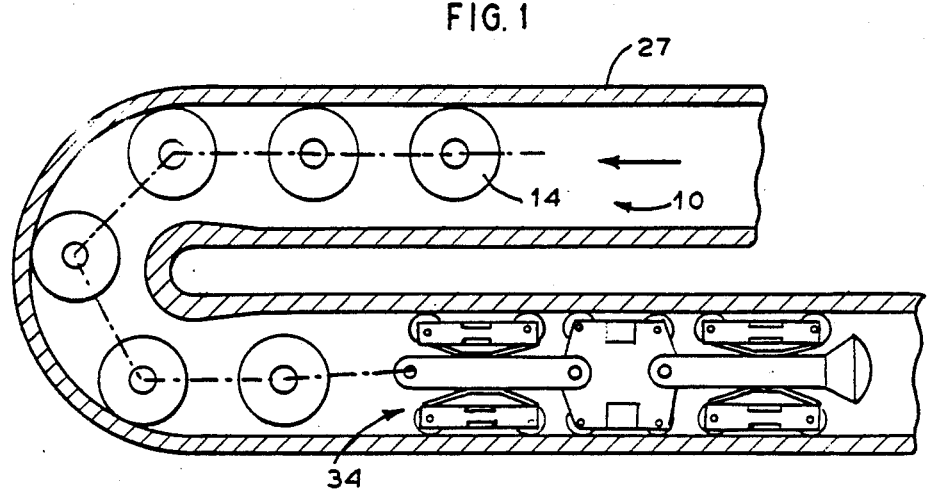
FIG. 1 is a schematic view of the invention in a tube section.
Figure 2:
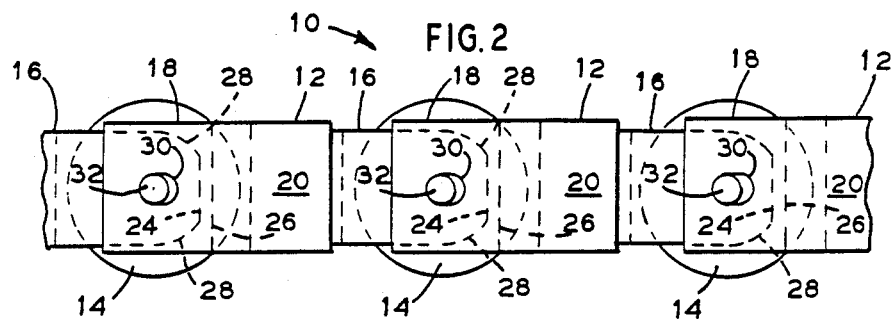
FIG. 2 is a side view of the invention.
Figure 3:
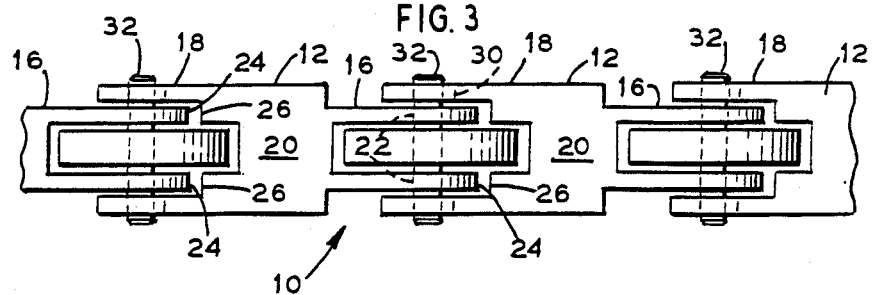
FIG. 3 is a top view of the invention.

Referring to the drawings, it is seen in FIGS. 1-3 that the invention is generally referred to by the numeral 10. Positioning spine 10 is generally comprised of a plurality of rigid links 12 and wheels 14.

As best seen in FIGS. 2 and 3 links 12 are identical and of a generally rectangular configuration. Each link has first and second bifurcated ends 16, 18 which extend outwardly from central link portion 20 along the longitudinal axis thereof. As best seen in FIG. 3, first bifurcated end 16 is narrower than central link portion 20 and sized to slidably fit within second bifurcated end 18. First bifurcated end 16 is provided with bore 22 therethrough perpendicular to the longitudinal axis. Means for preventing buckling of the mated links during insertion and maintaining rigid straightness when under compressive forces is provided in the form of flat alignment faces on the bifurcated ends.

First bifurcated end 16 is provided with flattened end face 24 perpendicular to the longitudinal axis of link 12. Second bifurcated end 18 is provided with flat inner faces 26 which correspond to flattened end faces 24. It can be seen that during compression (insertion of positioning spine 10 into tube 27) alignment and contact between flat faces 24 and 26 of adjacent links serves to resist any tendency toward buckling between links, thus maintaining rigid straightness of positioning spine 10 in straight portions of the tube.

Means for allowing pivoting of one link relative to an adjacent link for traveling through a tubing bend is also provided. Flattened end face 24 is provided with rounded corners 28. Second bifurcated end 18 is provided with bore 30 which is substantially oval shaped and perpendicular to the longitudinal axis of link 12. Pivot pin 32 is accepted in bores 22 and 30 for mating of adjacent links together. Pivot pin 32 is slidably received within bore 30 along its radial axis. This provides for pivotal and sliding connection of adjacent links. During insertion, this allows adjacent links to slide together, resulting in contact of flat faces 24, 26. This contact prevents buckling of links in the straight part of tube 27. However, upon reaching a bend in tube 27, as illustrated in FIG. 1, sufficient lateral force from the tube bend causes sliding of a link 12 relative to an adjacent link. This reduces contact between faces 24 and 26 and allows rotation of the link on rounded corners 28 to follow the bend of tube 27. Positioning spine 10 may be designed to accomodate a variety of angles of tube bend by varying the length of flattened end face 24.

To reduce drag during insertion and removal a wheel 14 is rotatably mounted on each pivot pin 32.

Figure 4:
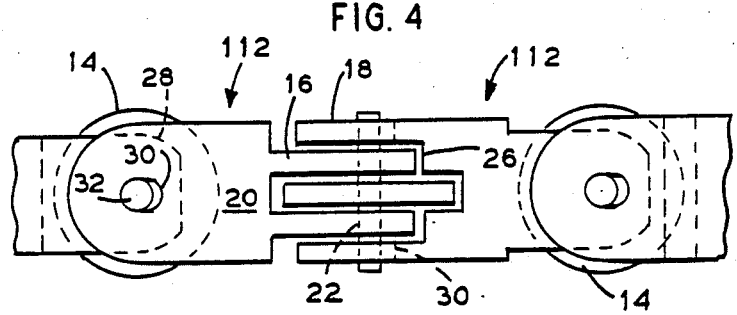
FIGS. 4, 5 and 6 illustrate alternate embodiments of the invention.

An alternate embodiment of the invention is illustrated in FIG. 4. It is seen that link 112 utilizes the same alignment and sliding features of the invention as described above. However, one of first or second bifurcated ends 16, 18 is rotated about the longitudinal axis of link 112 by 90 degrees relative to the other end. This accomodates bending in two planes.

Figure 5:
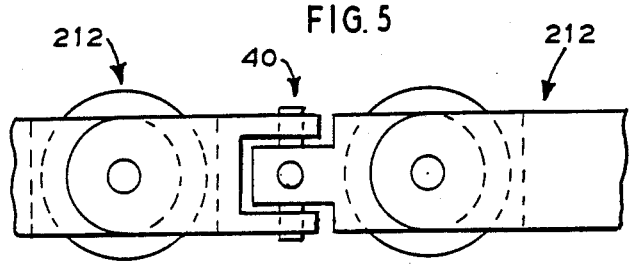

The alternate embodiment illustrated in FIG. 5 also accomodates bending in two planes. Links 212 are provided with u-joints 40 at each end and also utilize the same sliding features as described above to maintain straightness during insertion in the straight part of the tube being inspected. Each link is provided with a rectangular slot through substantially its central portion, as indicated in phantom view by the vertical dotted lines, with a rectangular slot therethrough and a circular bore positioned at a ninety degree angle to the rectangular slot. A pin received in the circular bore extends through the rectangular slot and has a wheel rotatably mounted thereon.

Figure 6:
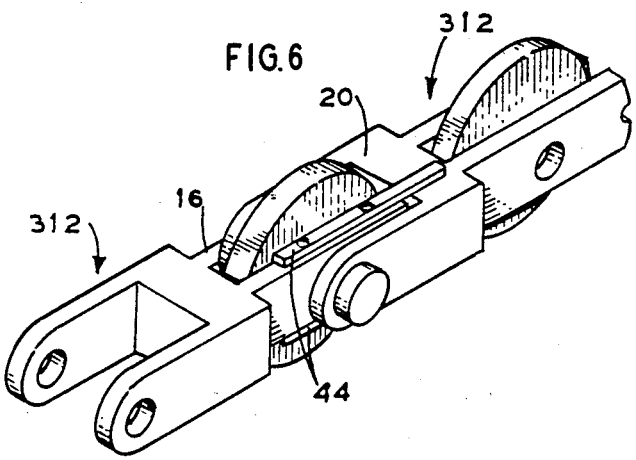

The alternate embodiment of FIG. 6 illustrates links 312 which utilize the same sliding features as described above. Means for maintaining rigid straightness of the mated links when under compressive forces is provided in the form of springs 44. Springs 44 are substantially straight springs formed from suitable material for such an application and are rigidly attached to the first bifurcated end of link 312 so as to extend over central link portion 20 of an adjacent link. At least two springs 44 are provided, on opposite sides of first bifurcated end 16 to provide straightening force from both bending directions. This provides a spring-loaded joint capable of bending as it travels through a tube bend but which returns to its normal straight position upon leaving the tube bend.

In operation, positioning spine 10 is attached to an inspection assembly 34 which has one end similar to that of link 12 for proper mating and alignment. Inspection assembly 34 and positioning spine 10 are then inserted into tube 27 with the use of a driving mechanism, not shown, outside of tube 27. The sliding of links 12 together and contact of flat faces 24,26 maintain straightness of positioning spine 10 in the straight portions of tube 27. At tube bends lateral forces cause sliding of adjacent links which allows rotation on rounded corners 28 to follow the tube bend. After inspection of tube 27 is completed the direction of the driving mechanism is reversed and positioning spine 10 and inspection assembly 34 are removed. During removal the tension on the separate links allows alignment of the links in conjunction with the geometry of the tube. During insertion and removal wheels 14 reduce drag while rolling on the interior of tube 27. Positioning spine 10 may be formed from any suitable solid material. For purposes of economy, castables such as metal or plastic or molded parts of delrin are preferred.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A positioning spine, comprising:
   a. a plurality of identical links;
   b. each link having a longitudinal axis and first and second bifurcated ends spaced along the axis and rotated about the longitudinal axis 90 degrees to each other in the form of a U-joint;
   c. said second bifurcated end having a substantially oval bore therethrough perpendicular to the longitudinal axis;
   d. said first bifurcated end having a bore therethrough perpendicular to the longitudinal axis;
   e. a U-joint drive pin accepted in said bores of said first and second bifurcated ends of adjacent links for mating adjacent links together;
   f. means for maintaining rigid straightness of said mated links when under longitudinal compressive forces comprising flat inner alignment faces on said second bifurcated end and corresponding flat end alignment faces on said first bifurcated end; and
   g. means for allowing pivoting of one link relative to an adjacent link.

2. The positioning spine of claim 1, wherein said pivoting means comprises said first bifurcated end having rounded corners.

3. The positioning spine of claim 1, further comprising:
   a. each of said links having a rectangular slot through substantially the central portion of the link and a circular bore through the central portion of the link positioned at a 90 degree angle to said rectangular slot;
   b. a pin received in said circular bore; and
   c. a wheel rotatably mounted on said pin.

4. A positioning spine, comprising:
   a. a plurality of identical links;
   b. each link having a longitudinal axis and first and second bifurcated ends spaced along the axis and rotated about the longitudinal axis 90 degrees to each other in the form of a U-joint;
   c. said first bifurcated end having a bore therethrough perpendicular to the longitudinal axis and having a flattened end face with rounded corners;
   d. said second bifurcated end having a substantially oval bore therethrough perpendicular to the longitudinal axis and having flat inner alignment faces corresponding to said end face on said first bifurcated end;
   e. a U-joint drive pin accepted in said bores of said first and second bifurcated ends of adjacent links for mating adjacent links together;
   f. each of said links having a rectangular slot through substantially the central portion of the link and a circular bore through the central portion of the link positioned at a 90 degree angle to said rectangular slot;
   g. a pin received in said circular bore; and
   h. a wheel rotatably mounted on said pin.

* * * * *